US010843949B2

(12) United States Patent
de Boer et al.

(10) Patent No.: US 10,843,949 B2
(45) Date of Patent: Nov. 24, 2020

(54) ANAEROBIC PURIFICATION DEVICE WITH VARIABLE WATER COLUMN

(71) Applicant: Paques I.P. B.V., Balk (NL)

(72) Inventors: Jelle Hendrik de Boer, Balk (NL); Leonard Hubertus Alphonsus Habets, Sneek (NL); Remco de Vries, Franeker (NL); Veronica Henrika Johanna Groot Kormelinck, Joure (NL); Jacob Cornelis Theodorus Vogelaar, Balk (NL)

(73) Assignee: Paques I.P. B.V., Balk (NL)

( * ) Notice: Subject to any disclaimer, the term of this patent is extended or adjusted under 35 U.S.C. 154(b) by 0 days.

(21) Appl. No.: 16/329,237

(22) PCT Filed: Sep. 4, 2017

(86) PCT No.: PCT/EP2017/072119
§ 371 (c)(1),
(2) Date: Feb. 28, 2019

(87) PCT Pub. No.: WO2018/042037
PCT Pub. Date: Mar. 8, 2018

(65) Prior Publication Data
US 2019/0248686 A1 Aug. 15, 2019

(30) Foreign Application Priority Data
Sep. 2, 2016 (EP) .................................... 16187119

(51) Int. Cl.
C02F 3/00 (2006.01)
C02F 3/28 (2006.01)
(52) U.S. Cl.
CPC ............ C02F 3/006 (2013.01); C02F 3/2846 (2013.01); C02F 3/2873 (2013.01);
(Continued)

(58) Field of Classification Search
CPC ........ C02F 3/2846; C02F 3/2873; C02F 1/20; B01D 19/0057
(Continued)

(56) References Cited

U.S. PATENT DOCUMENTS

| 2011/0236274 A1* | 9/2011 | Buchmueller ......... C12M 29/00 422/187 |
| 2013/0319935 A1* | 12/2013 | Leitner ................. C02F 3/2846 210/603 |

FOREIGN PATENT DOCUMENTS

| EP | 0170332 A1 | 2/1986 |
| EP | 0474325 A1 | 3/1992 |

(Continued)

Primary Examiner — Claire A Norris
(74) Attorney, Agent, or Firm — N.V. Nederlandsch Octrooibureau; Catherine A. Shultz; Katelyn J. Bernier

(57) ABSTRACT

An anaerobic purification device for purification of wastewater, the anaerobic purification device comprising:
  a reactor tank (10) configured to, when in operation, have a sludge blanket formed at the bottom part;
  a fluid inlet (12) for, in operation, introducing influent into the reactor tank, the fluid inlet located in the lower section of the reactor tank (10);
  at least one gas-collecting system (13);
  at least one gas-liquid separation device (30);
  at least one riser pipe (22) connected to the at least one gas-collecting system (13) and discharging into the gas-liquid separation device (30);
  a downer pipe (24) connected to the gas-liquid separation device (30) and discharging into the bottom of the reactor tank (10); and
  a fluid outlet (16) comprising means for, in operation, varying the height of the fluid level (19) in the reactor tank within a predetermined range, the fluid outlet arranged at the upper section of the reactor tank (10);
wherein the fluid level control means comprises:
(Continued)

a fluid valve (15) configured to control the height of the fluid in the reactor tank within the predetermined range,
a fluid level detector (17),
a gas flow meter (33) configured to measure the production rate of gas in the anaerobic purification device, and
a controlling unit configured to regulate the fluid valve (15) to vary the height of the fluid level in the reactor tank (10) based on at least one of the fluid level detected by the fluid level detector (17) and the gas production rate detected by the gas flow meter (33).

10 Claims, 4 Drawing Sheets

(52) U.S. Cl.
CPC .. *C02F 2203/006* (2013.01); *C02F 2209/005* (2013.01); *C02F 2209/38* (2013.01); *C02F 2209/40* (2013.01); *C02F 2209/42* (2013.01); *Y02E 50/343* (2013.01)

(58) Field of Classification Search
USPC .................................... 210/188, 603, 539
See application file for complete search history.

(56) References Cited

FOREIGN PATENT DOCUMENTS

| | | |
|---|---|---|
| EP | 1888471 B1 | 11/2012 |
| EP | 3009408 A1 | 4/2016 |
| JP | 2009154156 A | 7/2009 |
| WO | 2013119119 A1 | 8/2013 |

\* cited by examiner

ANAEROBIC PURIFICATION DEVICE WITH VARIABLE WATER COLUMN

FIELD OF THE INVENTION

The invention relates to an anaerobic purification device for purification of wastewater with variable water height.

BACKGROUND OF THE INVENTION

Anaerobic purification devices for purification of fluid, such as wastewater, are known in the art. EP 170 332 B1 discloses an anaerobic purification device wherein wastewater that contains organic material is subjected to a process in which dissolved organic material is broken down under anaerobic conditions. Fluid enters a reactor tank of the purification device. Gas, more specifically, methane, is produced when the fluid with substances dissolved comes into contact with biomass located inside the tank. A circulation cycle of fluid is created, in which fluid is thrusted upwards together with the generated gas through a riser pipe, it reaches a degassing device located above the reactor wherein gas is separated from the fluid, and the gas leaves the device, while the fluid flows downwards to the bottom of the reactor in order to be used again in the cycle. However, fluctuations can occur when the upward flowing water and the rising gas bubbles stir up the biomass flocks and particles. This may generate turbulence that can result in excessive quantities of biomass to be flushed out of the reactor, considerably limiting the loading capacity of the reactor. EP 170 332 addresses this by creating a reactor including a plurality of gas collecting systems at different heights in the reactor, so as not to place the main gas load in an uppermost gas collecting system.

Patent EP 1 888 471 B1 describes that a certain height H3 is required to lift up water from the bottom compartment of the reactor to the top compartment. This height represents the height of the water column located above a point inside the downer pipe that is at the same height as the water level outside the downer pipe but inside the tank. Water is lifted up by the produced gas. The higher the value of H3, the more gas is required to lift the water. On the other hand, the lower the value of H3, the less gas is required to lift up the water.

The value of H3 has a second effect: it determines the potential energy of water in the degassing device and thus the amount of gravitational force that pushes the water from the degassing device down into the bottom reactor compartment. If the value of H3 is too low, the water column that needs to flow downwards has not enough force (water head) to overcome the resistance in the bottom compartment of the reactor. As a result, the water level in the degassing device located above the reactor will rise and may overflow. This leads to malfunctioning. Hence, a minimum level of H3 is required, as described in EP 1 888 471 B1.

There are several aspects for improvement in the design of EP 1 888 471 B1. First, the pollutant concentration in the wastewater is not identical for all applications. That means that for low concentrated wastewaters, little gas is produced and therefore little water is recycled. For highly concentrated wastewaters, on the other hand, a large amount of gas is produced and a large amount of water is recycled. The operator is not able to influence this phenomenon. Second, the resistance of the water flowing down to the reactor bottom compartment is not a fixed value but can change over time, and is different for different application types. This is mainly due to the resistance caused by the sludge blanket. The sludge blanket can be very dense (high resistance) or more fluid. The operator is also not able to influence this phenomenon. Third, as the value of H3 increases, the uplifted water develops a tendency to "burst-up", causing big shocks/vibrations and variations in flow.

US 2013/319935 A1 discloses an anaerobic purification device for purification of waste water comprising a separator for separating a mixture in sludge, water and gas and located in an upper part of the device, wherein the separator comprises a cyclone, with a fixed level of fluid in the reactor, and wherein an internal circulation is adjusted with an inner container used as an overflow.

There is therefore a need for an anaerobic purification device that can be adapted to different COD concentrations and to different resistance in the sludge blanket.

SUMMARY OF THE INVENTION

An objective of the present invention is to provide an improved anaerobic purification device that addresses at least one of the above identified aspects for improvement. This is realized by being able to vary the difference in water height between the water level in the reactor, and the level at which the water is brought up in the degassing device of the reactor. This variation makes it possible to operate under a larger variation of gas flows, while maintaining an optimal internal recirculation flow.

The volume of biogas produced in time is a function of the organic pollutant concentration, dissolved organic carbon (COD) in the wastewater. The higher the pollutant concentration, the higher the gas production when the wastewater enters into contact with the biomass inside the reactor and the more fluid is lifted up and recycled downwards by the internal recirculation. If the value of H3 is fixed, the ratio of recycled fluid to gas is also fixed, assuming a fixed resistance of the fluid flowing down to the bottom compartment (in the sludge blanket).

The inventors realized that the above identified issues can be addressed if the value of H3 is variable within a range by the operator depending on the type of an application being performed: high or low COD concentration in the wastewater, dense or fluid sludge blanket.

The invention provides an anaerobic purification device for purification of wastewater, the anaerobic purification device comprising:

a reactor tank configured to, when in operation, have a sludge blanket formed at the bottom part;

a fluid inlet for, in operation, introducing influent into the reactor tank;

at least one gas-collecting system;

at least one gas-liquid separation device;

at least one riser pipe connected to the at least one gas-collecting system and discharging into the gas-liquid separation device;

a downer pipe connected to the gas-liquid separation device and discharging into the bottom of the reactor tank; and a fluid outlet connected to fluid level control means for varying the height of a fluid level in the reactor tank within a predetermined range;

wherein the fluid level control means comprises:

a fluid valve (15) configured to control the height of the fluid in the reactor tank within the predetermined range, a fluid level detector (17), a gas flow meter (33) configured to measure the production rate of gas in the anaerobic purification device, and a controlling unit configured to regulate the fluid valve (15) to vary the height of the fluid level in the reactor tank (10)

based on at least one of the fluid level detected by the fluid level detector (17) and the gas production rate detected by the gas flow meter (33).

The fluid inlet can be arranged in a lower section (e.g. in the lower half or the lower quarter) of the reactor tank. The fluid outlet can be arranged at the upper section (e.g. in the upper half or the upper quarter) of the reactor tank.

The invention advantageously allows the fluid level to be varied under operating conditions in order to change the value of H3. This level may be varied by allowing a controlled amount of water from the upper section of the reactor to leave the reactor through the fluid outlet.

In the following description, "reactor tank", "reactor" and "tank" may be used interchangeably.

An embodiment of the invention provides an anaerobic purification device wherein the fluid outlet is connected to the reactor tank at a height equal to or below a lower boundary of the predetermined range, that is, at a predetermined height such that a lower boundary of the predetermined range is above the predetermined height.

In this way, it is guaranteed that the fluid outlet allows the fluid to leave the reactor until the fluid level reaches the minimum within the predetermined range, and it is guaranteed that the fluid can leave the reactor naturally flowing downwards, without the need of a pump or any other lifting means.

Another embodiment of the invention provides an anaerobic purification device further comprising an overflow located in the reactor tank at a height equal to or above an upper boundary of the predetermined range.

A gutter-like fluid overflow or tubing like extraction system may be located in the upper part of the reactor tank in order to collect the purified fluid that has not left the reactor tank through the fluid outlet and that reaches the top of the reactor tank.

An embodiment of the invention provides an anaerobic purification device wherein the fluid level control means comprises a fluid valve configured to control the height of the fluid in the reactor tank within the predetermined range.

An embodiment of the invention provides an anaerobic purification device wherein the fluid level control means comprises a fluid level detector, and wherein the height of the fluid level in the reactor tank is varied based on the measured fluid level.

A further embodiment of the invention provides an anaerobic purification device wherein the fluid level control means further comprises a gas flow meter configured to measure the production rate of gas in the anaerobic purification device, and wherein the height of the fluid level in the reactor tank is varied based on the measured production rate of gas.

A further embodiment of the invention provides an anaerobic purification device wherein the fluid level control means comprises a controlling unit for regulating the fluid valve based on the fluid level detected by the fluid level detector and the gas production rate detected by the gas flow meter.

The COD concentration in the fluid, such as wastewater, determines the theoretic amount of biogas produced per fluid volume. The COD concentration value is specific for each application, it is known for each application, and does not normally fluctuate much.

Based on the known theoretic COD concentration value, the invention provides a mechanism for setting the fluid level in the reactor to a specific value, an initial value, upon initialization or powering up of the reactor. According to an embodiment of the invention, a specific fluid level is determined for the COD value. The fluid level inside the tank may be measured by a fluid level detector which may be located at the bottom of the reactor tank, and based on this measurement, a fluid valve connected to the fluid level detector may control the fluid level to reach the determined value.

According to an embodiment of the invention, the absolute amount of biogas produced in the system may be used to vary the fluid level in order to adjust it to a suitable level that allows for a more efficient fluid recirculation. A starting value of the fluid level is determined beforehand, and this level may then be automatically modified during operation of the purification device, based on the production rate of biogas measured.

The terms "gas" and "biogas" may be used interchangeably throughout the following description.

A further embodiment of the invention provides an anaerobic purification device wherein the gas flow meter is configured to measure the production rate of gas in the gas-liquid separation device. In a further embodiment, the gas flow meter is configured to measure the production rate of gas in the reactor tank.

The gas produced in the purification device reaches the gas-liquid separation device and leaves the system from there. According to an embodiment of the invention, the gas flow meter is configured to measure the gas production rate that leaves the gas-liquid separation device, in order to provide an accurate measurement.

A further embodiment of the invention provides an anaerobic purification device wherein if the measured production rate of gas is higher than a predetermined value, the fluid valve is configured to allow fluid to leave the tank through the fluid outlet, thereby decreasing the fluid level in the tank.

A further embodiment of the invention provides an anaerobic purification device wherein if the measured production rate of gas is lower than a predetermined value, the fluid valve is configured to not allow fluid to leave the tank through the fluid outlet, thereby increasing the fluid level in the tank.

A higher gas production rate has a stronger gas lift. This means that more water can be lifted up by the gas lift and more water recirculates through the reactor. This high circulation may cause too much turbulence and shocks. In order to avoid the high circulation, the water level may be decreased. A lower water level means that more hydrostatic pressure needs to be overcome and less water is recirculated. As the lower amount of water is brought up to the gas-liquid separation device which is located at a relatively higher water level, compared to the level inside the reactor, it has sufficient gravitational force to flow downwards to the bottom of the reactor and to mix with influent water inside the sludge blanket.

A lower gas production, on the contrary, produces a weaker gas lift that will slow down and eventually stop, having the risk of not generating a sufficient fluid circulation. In order to prevent this, a higher fluid level is required so as to create a shorter path for the gas and fluid using the gas lift when they rise upwards, allowing the production of more liquid circulation. The present invention therefore adapts the purification mechanism to the different gas production rates in the purification device, so that the circulation of fluid is not affected. It is possible to tolerate a great variation in the amount of gas without hindering the fluid circulation.

By allowing fluid to leave the tank when the production rate of gas is higher than a predetermined value, the fluid level is reduced and therefore a longer path is created for the gas and fluid in the transportation system, producing less turbulence because the gas-rich fluid needs to overcome a higher hydrostatic pressure.

By not allowing fluid to leave the tank when the production rate of biogas is lower than a predetermined value, the fluid level is kept high and therefore the gas and fluid have a shorter path to go through in the transportation system, enough fluid recirculation can be generated.

A further embodiment of the invention provides an anaerobic purification device further comprising at least one fluid collecting device located inside the reactor tank at a height below the minimum fluid level of the predetermined range, wherein the at least one fluid collecting device is configured to collect fluid and to transport it to the fluid outlet.

The fluid collecting device may contain at least one conduct into which the fluid in the upper part of the reactor tank flows and is led to the fluid outlet from which it leaves the system.

A further embodiment of the invention provides an anaerobic purification device wherein the reactor tank comprises at least two gas-collecting systems of which the at least one gas-collecting system is a lower gas-collecting system and an upper gas-collecting system is located below the fluid level and above the lower gas-collecting system configured to remove gas from the fluid contained in the tank.

A further embodiment of the invention provides an anaerobic purification device wherein the riser pipe is configured to raise fluid contained in the reactor tank by gas lift action caused by gas collected in the at least one gas-collecting system.

A further embodiment of the invention provides an anaerobic purification device wherein the downer pipe is configured to return fluid from the gas-liquid separation device to the bottom of the reactor tank.

A further embodiment of the invention provides an anaerobic purification device wherein the gas-liquid separation device comprises a gas outlet configured to allow gas that reaches the gas-liquid separation device to leave the system.

The invention further provides a method for purification of fluid such as wastewater by using the anaerobic purification device.

The present invention provides an improvement in the performance and efficiency of the system, because the fluid level is adapted to the amount of gas produced per cubic meter of fluid to be purified, thereby controlling the amount of recirculating fluid and preventing either too little recirculation, or unwanted fluctuations or overflows in the fluid recirculation.

BRIEF DESCRIPTION OF THE FIGURES

On the attached drawing sheets.

DETAILED DESCRIPTION

Figure 1:
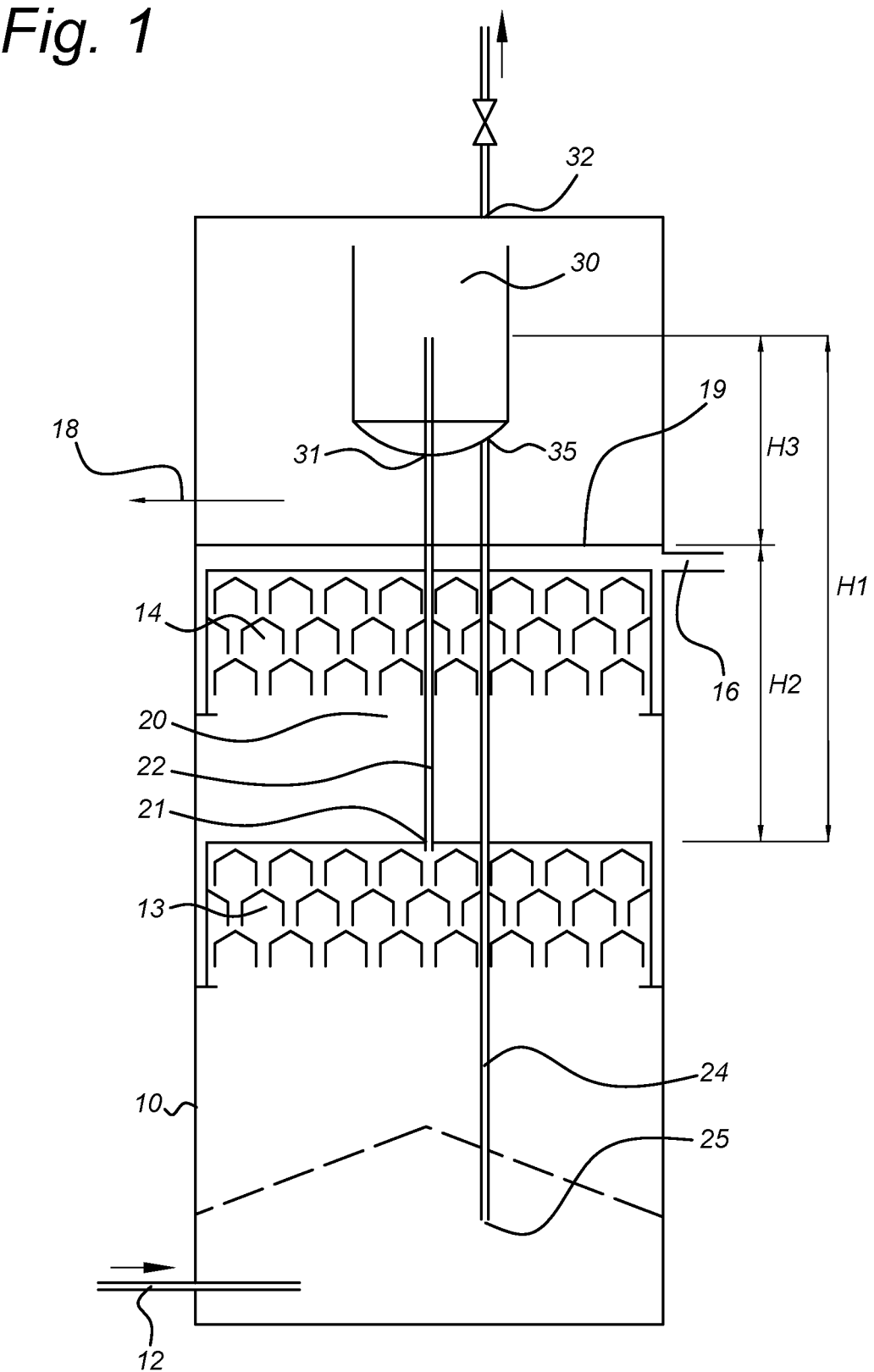
FIG. 1 schematically shows an anaerobic purification device according to an embodiment of the invention, FIG. 2 schematically shows an anaerobic purification device according to an embodiment of the invention.

FIG. 1 schematically shows anaerobic purification device according to an embodiment of the invention.

The anaerobic purification device of FIG. 1 comprises three parts: a reactor tank 10, a transportation system 20 and a gas-liquid separation device 30. The reactor tank comprises a fluid inlet 12 through which fluid, for example wastewater, to be purified, enters the anaerobic purification device under operating conditions. This fluid contains organic material with a specific level of COD (dissolved organic carbon measured as chemical oxygen demand), in other words, a specific amount of impurities. The COD level of the fluid decreases as it goes up through the reactor tank since it is converted into biogas due to the biomass present in the reactor tank.

When in operation the fluid enters the tank through the fluid inlet 12, the impurities dissolved in the fluid come into contact with biomass present in the tank, and methane is produced. On its way up, the fluid traverses a plurality of gas-collecting systems, each comprising a plurality of hoods wherein the gas is retained. The embodiment of FIG. 1 includes two gas-collecting systems, but the invention is not limited thereto.

According to an embodiment of the invention, a lower gas-collecting system 13 collects gas contained in the fluid that rises through the reactor tank, and the lower gas-collecting system 13 guides the retained gas to the transportation system 20. More specifically, the lower gas-collecting system guides the gas to a riser pipe 22 through which the gas rises until it reaches the gas-liquid separation device 30. This gas contains fluid, and in the gas-liquid separation device, 30 the gas and the fluid are separated, being the gas released through a gas outlet 32, and being the fluid brought back to the bottom of the reactor tank through a downer pipe 24. This fluid can in this way be recycled and again used in the purification cycle.

The fluid that rises through the reactor tank 10 reaches then an upper gas-collecting system 14 where the gas that was not collected in the lower gas-collecting system 13 is collected. Here, although not represented in the drawings, the gas may be led for example through an additional pipe to directly enter the gas outlet 32 or, if the gas-liquid separation device 30 is located inside the reactor tank 10, the gas may rise to the upper part of the reactor tank and leave from there through the gas outlet 32. Clean fluid reaches a level in the reactor tank 10 wherein a fluid outlet 16 is located which allows the clean fluid that has risen through the tank to leave the anaerobic purification device. The fluid outlet 16 is located at a height in the reactor equal to or below a minimum permitted fluid level. At a height in the tank higher than the location of the fluid outlet 16, an overflow 18 collects the clean fluid that is not collected by the fluid outlet, and guides the fluid out of the anaerobic purification device. The overflow is preferably located at a height equal to or above a maximum permitted fluid level, as a safeguard mechanism to avoid that fluid reaches a fluid level higher than the maximum permitted.

The fluid level inside the reactor tank may be controlled according to an embodiment of the invention. A different fluid level inside the reactor tank generates a different pressure head of the fluid column in the downer pipe. If the amount of gas produced in the system is measured, the fluid level can be adapted to this measured level, and therefore the fluid may circulate unhindered independently of whether there is more or less gas in the system.

At the top of the reactor, a quiet flow is required, but at the bottom of the reactor, a good mixing of fluid and sludge is required. Since most of the gas is collected in the lower gas-collecting system 13, the amount of gas that keeps rising through the reactor is small. It is then collected by the upper gas-collecting system 14, and therefore the quiet flow in the upper part of the reactor is in this way achieved. In order to achieve a good mixing of fluid and sludge at the bottom of the reactor, the energy obtained from the gas lifting fluid in the riser pipe 22 may be used. The lifted fluid is separated from the gas in the gas-liquid separation device 30, and using the hydraulic gravity pressure it is returned to the bottom of the reactor through the downer pipe 24.

Since the gas lifts the fluid well above the fluid level in order to bring it to the gas-liquid separation device 30, the fluid column in the downer pipe 24 generates a powerful flow that allows for extra blending at the bottom of the reactor. In this manner tranquility is achieved at the top of the reactor and an energetic mixing is achieved at the bottom.

However, the production rate of gas is different for different applications. A production rate of gas inside the purification device may be measured, and the fluid level within the tank may be varied accordingly, in order to achieve the quiet flow at the top of the tank and the energetic mixing at the bottom independently from the amount of gas produced. The higher the production rate of gas, the stronger the gas lift that is generated, and the more powerful is the flow of fluid that goes down through the downer pipe 24. If the production rate of gas measured is higher than a specific value, the fluid level may be decreased, by allowing fluid from the upper part of the tank to leave through the fluid outlet 16, A larger gravitational resistance for the gas and fluid in the transportation system is generated, because the gas and fluid in the riser pipe 22 have to overcome a higher hydrostatic pressure and therefore a too intense flow is avoided. On the other hand, if the production rate of biogas measured in the transportation system is lower than a specific value, the fluid level may be increased, by letting the fluid normally in through the fluid inlet 12 and not allowing fluid from the upper part of the tank to leave through the fluid outlet 16. The higher fluid level means that less gravitational resistance for the gas and fluid in the transportation system is generated and therefore sufficient fluid circulation is achieved. The process of controlling the fluid level will be explained in detail with reference to the subsequent figures. In this manner, the fluid level is adapted to the amount of biogas generated in the system, and a situation is avoided in which too much gas in the system provokes fluctuations when the fluid level is high, or in which too little gas in the system provokes insufficient thrust and fluid circulation cannot smoothly take place.

Although the change in the fluid level is based on the production rate of biogas measured, if the resistance in the sludge blanket is too high, and recirculation fluid does not flow downwards anymore, the water level in the reactor may also be decreased. In this way the hydrostatic head is increased so that although less fluid is recirculated, the recirculation fluid has a sufficient hydrostatic head to overcome the resistance in the sludge blanket.

Figure 2:
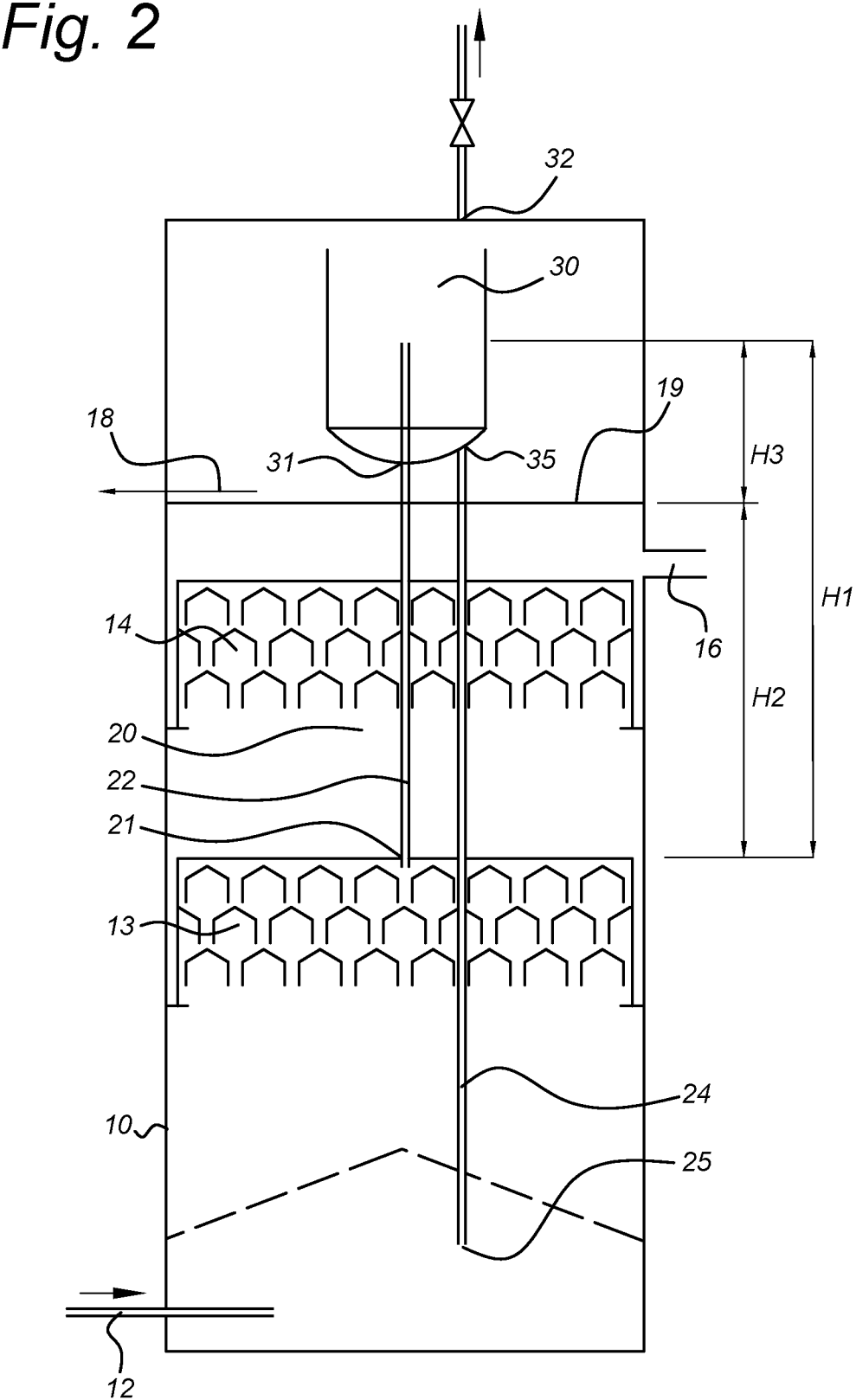

According to embodiments of the invention, the reactor tank may be a closed space and the gas-liquid separation device may also be covered in the closed space FIG. 2 schematically shows an anaerobic purification device according to an embodiment of the invention.

In FIG. 2, an embodiment of the present invention is shown in which the fluid level 19 is at a maximum value within the predetermined range, defining a minimum height H3. This minimum height H3 generates a minimum pressure head in the downer pipe 22 and therefore it is appropriate for low gas production rates, wherein the gas and fluid can be lifted through a short path and therefore they can reach the gas-liquid separation device with enough energy to allow the fluid to go down to the bottom compartment. This fluid level 19 is therefore desired for applications wherein a low amount of gas is generated. On the other side, FIG. 1 shows a fluid level 19 that is at a minimum value within the predetermined range, defining a maximum height H3. This maximum height H3 generates a maximum gravitational resistance for the water and gas mixture to be lifted up into the gas-liquid separation device 30 and therefore it is appropriate for high gas production rates wherein the gas and fluid have enough energy, because therefore a longer path allows the gas and fluid mixture to arrive at the gas-liquid separation device without unwanted fluctuations. This fluid level 19 is desired for applications where high amounts of gas are generated.

Figure 3:
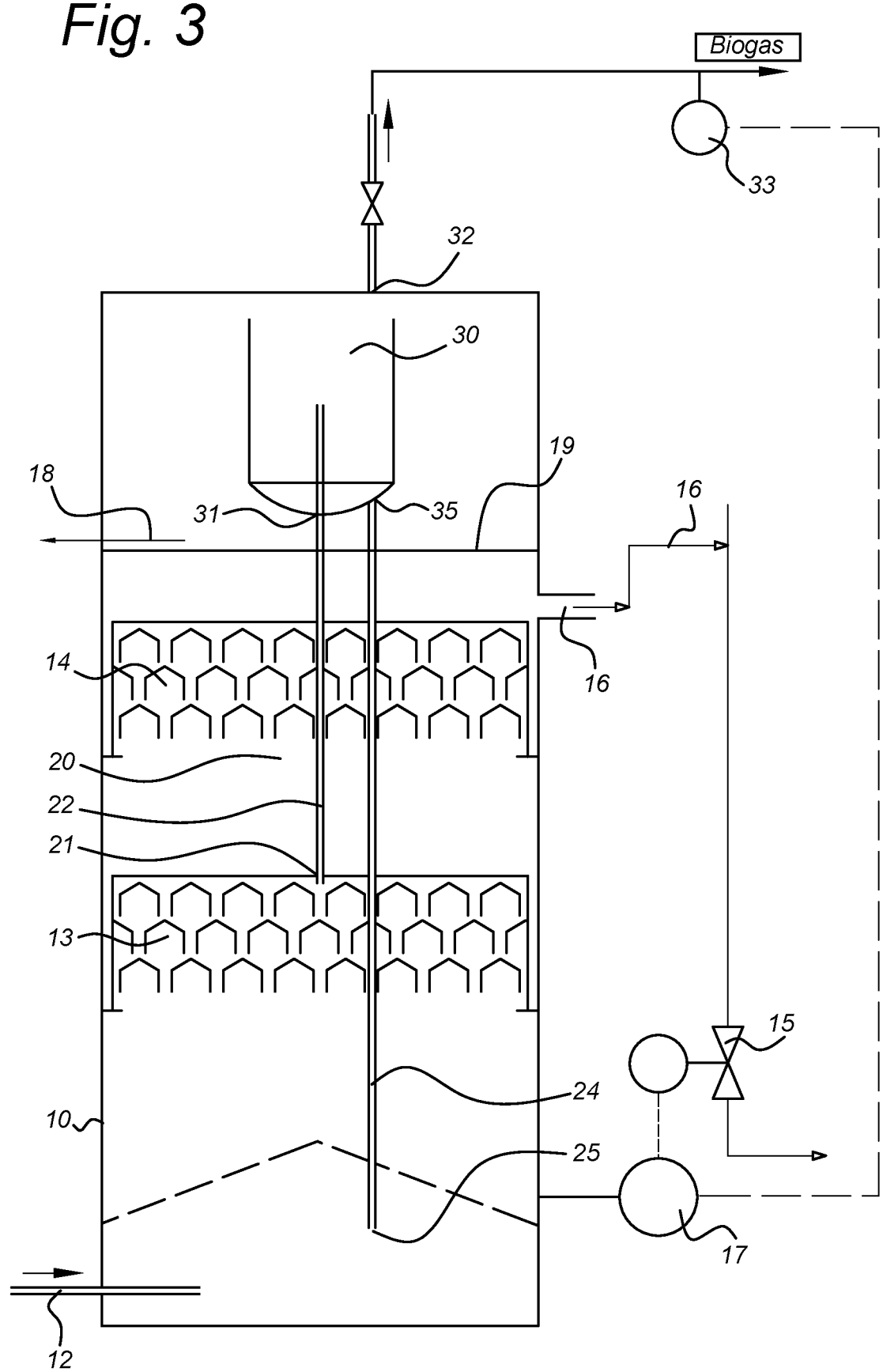
FIG. 3 shows a flow diagram of fluid within the anaerobic purification device according to an embodiment of the invention.

FIG. 3 shows a flow diagram of fluid within the anaerobic purification device according to an embodiment of the invention.

According to an embodiment of the invention, fluid such as wastewater enters the tank through fluid inlet 12. The fluid ascends through the tank and reaches the lower gas-collecting system 13. In this lower gas-collecting system gas is separated from the fluid and retained, and the fluid can keep ascending through the tank and reaches the upper gas-collecting system 14. Here the remaining gas is retained, and clean fluid rises and exits the tank through a fluid outlet 16 located in the upper part of the tank 10. If the speed at which the fluid level 19 increases is higher than the speed at which fluid may leave the device through the fluid outlet 16, the fluid that is not able to leave the device through the fluid outlet may be collected by a gutter-like overflow 18 located at a higher point in the tank 10 that acts as a safeguard to avoid that fluid inside the reactor reaches a level above a maximum.

The gas retained in the lower gas-collecting system 13, including fluid particles, rises through the riser pipe 22 until it reaches the gas-liquid separation device 30. Here, the gas and the fluid are separated and the gas may leave the system through a gas outlet 32, while the fluid may flow down to the bottom of the reactor through the downer pipe 24 in order to be recycled and continue being used in the purification process. The gas retained in the upper gas-collecting system 14 may be led to enter directly the gas outlet 32 or it may rise to reach a gas headspace located in the upper part of the reactor if the gas-liquid separation device is enclosed inside the reactor tank, and leave from here through the gas outlet 32.

According to an embodiment of the invention, an initial fluid level 19 is determined. Depending on the type of application for which fluid needs to be purified, the fluid that enters the purification device may contain a different COD concentration. The COD concentration in the fluid that enters the reactor determines the amount of biogas that will be generated in the system per volume of fluid. Upon initialization or setting up of the purification device for a specific application, the fluid level 19 in the reactor may be set to a specific value based on the theoretic COD concentration value. A fluid level detector 17 may measure the fluid level 19 inside the tank, and based on this measurement, a fluid valve 15 connected to the fluid level detector 17 may control the fluid level to be adjusted to the specific value. The fluid level detector 17 may perform the fluid level measurement at the bottom of the reactor 10. However, the fluid level detector 17 may also be arranged elsewhere. In an embodiment, the fluid level detector comprises a pressure sensor.

However, although the actual COD concentration value does not normally fluctuate much from the theoretic value, it may slightly vary, and the fluid level 19 may also be varied accordingly, in order to achieve a more efficient recirculation process. The absolute amount of biogas produced in the system may be used to vary the fluid level 19. According to an embodiment of the invention, a gas flow meter 33 connected to the fluid level detector 17 may measure the production rate of biogas in the system. Based on the production rate of biogas in the system, a controlling or processing unit connected to the fluid level detector, the gas flow meter and the fluid valve 15 may determine whether it is necessary to increase or reduce the fluid level 19 inside the reactor tank, and it may consequently activate the fluid valve 15 to control the fluid level accordingly.

The invention therefore provides a mechanism by which a starting fluid level 19 is determined beforehand, and a fine tuning can continuously be provided by varying the fluid level depending on the COD concentration in the fluid.

The production rate of gas determines the fluid level 19 inside the reactor 10. The optimal fluid level for a specific production rate of gas may be calculated beforehand and stored in a processing or controlling unit connected to or forming part of the purification device, connected to the fluid valve 15, the fluid level detector 17 and the gas flow meter 33. If the amount of gas generated is lower than a specific level, the fluid level 19 may be increased so that the path for the gas and fluid mixture is short enough for enough energy to be generated. for the fluid circulation. This may be done by closing the valve 15 and not allowing fluid to leave the tank through the fluid outlet 16, so that the fluid level 19 will rise with the fluid that normally enters the reactor through the fluid inlet 12.

On the other hand, if the amount of gas is higher than a specific value, then it is allowed that the fluid level 19 decreases so that the path for the gas and fluid mixture is long enough for the energetic mixture to arrive at the gas-liquid separation device without unwanted fluctuations. The fluid valve 15 regulates the amount of fluid that is allowed to leave the tank through the fluid outlet 16. The fluid level according to the invention may be varied within a predetermined range that ensures that even in the extreme situations of a maximum or minimum fluid level the fluid has enough energy for recirculation. By adapting the fluid level to the amount of gas generated in the system, the fluid flow in the recycling circuit is maintained unaffected, and fluctuations or insufficient energy are avoided, because the fluid level is constantly being adapted to the gas production rate.

The gas flow meter 33 of FIG. 3 is located in the upper part of the purification device, in order to measure the amount of gas that leaves the system through the gas outlet 32 of the gas-liquid separation device. It should however be noted that the invention is not limited to this location, and that other locations are also suitable.

Figure 4:
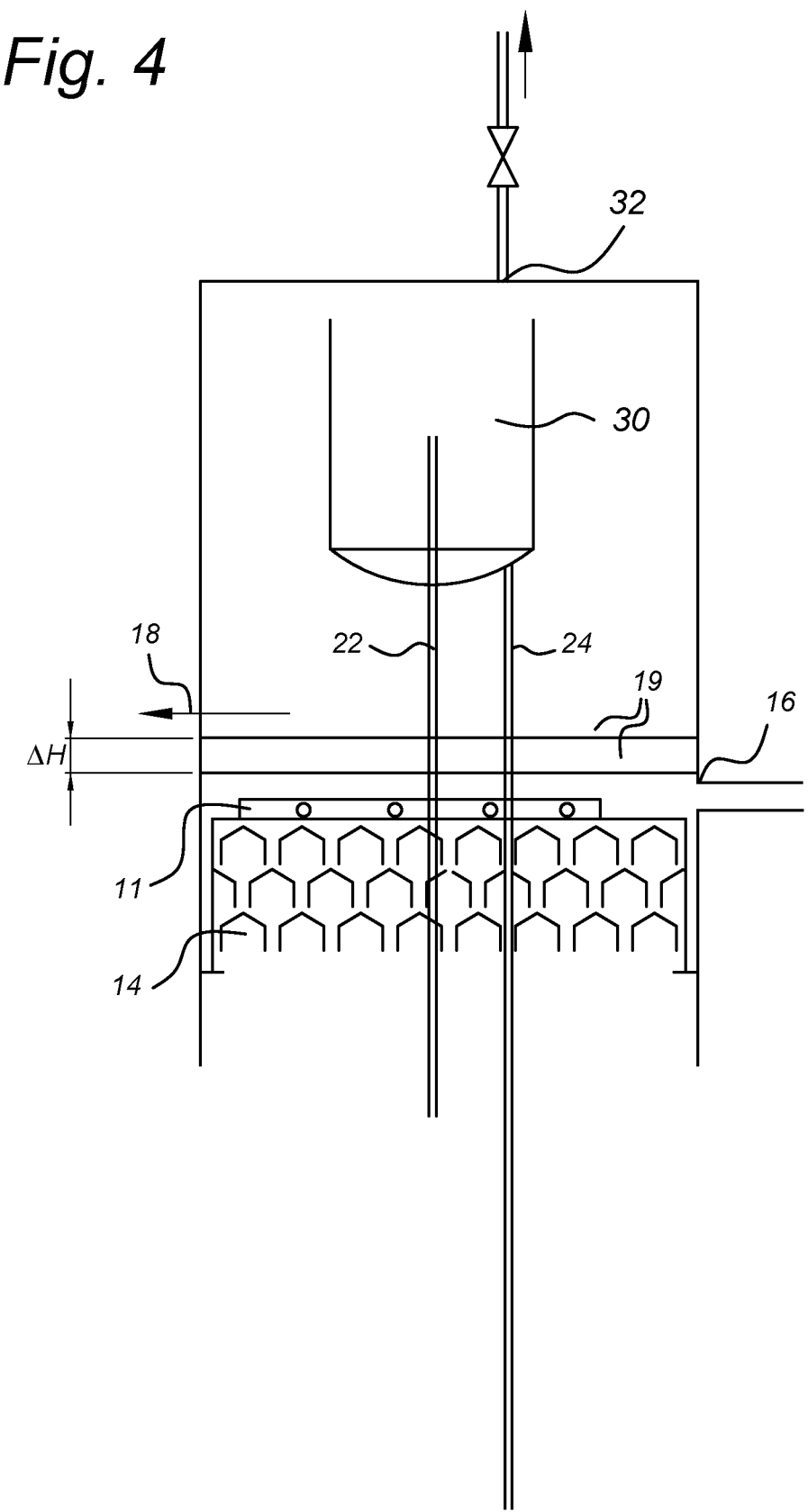
FIG. 4 shows the upper part of the reactor tank of the anaerobic purification device according to an embodiment of the present invention.

FIG. 4 shows the upper part of the reactor tank of the anaerobic purification device according to an embodiment of the present invention.

When the fluid level 19 in the tank may be reduced, in order for the fluid in the upper section of the tank 10 to leave the tank through the fluid outlet 16, the fluid in the upper section of the tank is collected by at least one fluid collecting device 11. This fluid collecting device may comprise at least one conduct into which the fluid in the upper part of the tank 10 flows. In an embodiment of the invention a plurality of conducts are used, but the invention is not limited thereto.

According to an embodiment of the invention, between two and ten conducts are used, preferably between four and six.

The fluid collecting device 11 is located at a height in the reactor tank 10 above the upper gas-collecting system 14, and below the minimum fluid level 19, so that fluid can always naturally flow into the fluid collecting device in order to leave the reactor through the fluid outlet 16.

The anaerobic purification device according to embodiments of the present invention allows for a fine adjustment of the system parameters by adapting the fluid level 19, between a predetermined range defined by $\Delta H$, to the amount of gas generated in the system, while a coarse adjustment of the system parameters may be achieved by the selection of specific parameters upon manufacturing of the anaerobic purification device, or upon initialization of the anaerobic purification device.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

LIST OF REFERENCE SYMBOLS

Similar reference numbers that have been used in the description to indicate similar elements (but differing only in the hundreds) have been omitted from the list below, but should be considered implicitly included.

10 Reactor tank
11 Fluid collecting device
12 Fluid inlet
13 Lower gas-collecting system
14 Upper gas-collecting system
15 Fluid valve
16 Fluid outlet
17 Fluid level detector
18 Overflow
19 Fluid level
20 Transportation system
21 Riser pipe inlet
22 Riser pipe
24 Downer pipe
25 Downer pipe discharge
30 Gas-liquid separation device
31 Riser pipe discharge
32 Gas outlet
33 Gas flow meter
35 Downer pipe inlet
H1 Maximum fluid column height
H2 Minimum fluid column height H3 Water column height
ΔH Predetermined range of water level variation

The invention claimed is:

1. An anaerobic purification device for purification of wastewater, the anaerobic purification device comprising:
 a reactor tank configured to, when in operation, have a sludge blanket formed at the bottom part;
 an influent inlet for, in operation, introducing influent wastewater into the reactor tank;
 at least one gas-collecting system;
 at least one gas-liquid separation device;
 at least one riser pipe connected to the at least one gas-collecting system and discharging into the gas-liquid separation device;
 a downer pipe connected to the gas-liquid separation device and discharging into the bottom of the reactor tank; and
 a liquid outlet comprising or connected to liquid level control means for, in operation, varying the height of a liquid level in the reactor tank within a predetermined range;
 wherein the liquid level control means comprises:
 a liquid valve configured to control the height of the liquid in the reactor tank within the predetermined range,
 a liquid level detector,
 a gas flow meter configured to measure the production rate of gas in the anaerobic purification device, and
 a controlling unit configured to regulate the liquid valve to vary the height of the liquid level in the reactor tank based on the liquid level detected by the liquid level detector and the gas production rate detected by the gas flow meter.

2. The anaerobic purification device according to claim 1, wherein the liquid outlet is connected to the reactor tank at a predetermined height such that a lower boundary of the predetermined range is above the predetermined height.

3. The anaerobic purification device according to claim 1, wherein the gas flow meter is configured to measure a signal indicative of the production rate of gas in the reactor tank.

4. The anaerobic purification device according to claim 1, wherein if the measured production rate of gas is higher than a predetermined value, the liquid valve is configured to allow liquid to leave the tank through the liquid outlet, thereby decreasing the liquid level in the tank.

5. The anaerobic purification device according to claim 1, wherein if the measured production rate of gas is lower than a predetermined value, the liquid valve is configured to not allow fluid liquid to leave the tank through the fluid outlet, thereby increasing the liquid level in the tank.

6. The anaerobic purification device according to claim 1, further comprising at least one liquid collecting device located inside the reactor tank at a height below the minimum liquid level of the predetermined range, wherein the at least one liquid collecting device is configured to collect liquid and to transport the collected liquid to the liquid outlet.

7. The anaerobic purification device according to claim 1, wherein the reactor tank comprises at least two gas-collecting systems, of which the at least one gas-collecting system is a lower gas-collecting system and an upper gas-collecting system is located below the fluid liquid level and above the lower gas-collecting system.

8. The anaerobic purification device according to claim 1, wherein the riser pipe is configured to raise liquid contained in the reactor tank by gas lift action caused by gas collected in the at least one gas-collecting system.

9. The anaerobic purification device according to claim 1, wherein the gas-liquid separation device comprises a gas outlet configured to allow gas that reaches the gas-liquid separation device to leave the system.

10. A method for purification of wastewater by using an anaerobic purification device according to claim 1, the method comprising
 introducing influent wastewater into the reactor tank;
 detecting the liquid level in the reactor tank;
 measuring the production rate of gas in the anaerobic purification device; and
 controlling the liquid level height in the reactor tank within the predetermined range through regulating the liquid valve to vary the height based on the liquid level detected and the gas production rate detected.

* * * * *